(12) United States Patent
Mahajan

(10) Patent No.: US 7,130,280 B2
(45) Date of Patent: Oct. 31, 2006

(54) ENHANCED CALL SERVICE PACKET DATA TERMINAL

(75) Inventor: Sanjeev Mahajan, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1017 days.

(21) Appl. No.: 10/060,752

(22) Filed: Jan. 30, 2002

(65) Prior Publication Data

US 2003/0142662 A1    Jul. 31, 2003

(51) Int. Cl.
*H04L 12/16*    (2006.01)
(52) U.S. Cl. ............... 370/261; 370/263; 455/416; 379/158
(58) Field of Classification Search ......... 370/260, 370/261, 263, 266; 455/416; 379/158
See application file for complete search history.

(56) References Cited

U.S. PATENT DOCUMENTS

| | | | | |
|---|---|---|---|---|
| 4,160,878 A | * | 7/1979 | Hirschmann et al. | 370/266 |
| 4,794,591 A | * | 12/1988 | Hoff et al. | 370/268 |
| 5,812,534 A | * | 9/1998 | Davis et al. | 370/260 |
| 5,838,665 A | * | 11/1998 | Kahn et al. | 370/260 |
| 6,026,295 A | * | 2/2000 | Okada | 455/416 |
| 6,466,550 B1 | * | 10/2002 | Foster et al. | 370/261 |
| 6,480,474 B1 | * | 11/2002 | Johnson et al. | 370/260 |
| 6,813,360 B1 | * | 11/2004 | Gentle | 381/23 |

* cited by examiner

*Primary Examiner*—Hassan Kizou
*Assistant Examiner*—Anthony Sol

(57) ABSTRACT

In communication system (200), a packet data terminal (102) (e.g., personal computer (PC), personal digital assistant (PDA), telephone, mobile radiotelephone, network access device, Internet peripheral, and the like) initiates, coordinates, and controls the provision of on-demand conference call and call waiting services as a function of user inputs without the need for coordination of network resources that dominate conference call service as currently known and practiced. The packet data terminal permits users to establish call conference services for originating and terminating calls, alike. In addition, multi-party call waiting (two or more parties on-hold) services are established.

17 Claims, 6 Drawing Sheets

ENHANCED CALL SERVICE PACKET DATA TERMINAL

FIELD OF THE INVENTION

The present invention relates generally to enhanced call services, and in particular, to a method and apparatus that sponsors packet based voice over Internet protocol (VOIP) telephone services such as, for example, call waiting and conference calling.

BACKGROUND OF THE INVENTION

Packet-based communication systems are well known. Such systems allow user terminals (e.g., personal computers (PCs), personal digital assistants (PDAs), telephones, mobile radiotelephones, modems, network access devices, Internet peripherals, and their equivalents) to communicate with each other and with other communication networks, such as, for example, the Internet and the public telephone network.

Enhanced call services within packet-based communication systems are also well known. Such services include, but are not limited to offerings such as call waiting, call forwarding, and call conferencing, including 3-way calls, multi-party calls, and the like. As will be appreciated, the typical call service is implemented and controlled by the governing communication system, and not the user terminal.

By way of example, and with reference to FIG. 1, it will be appreciated that establishment of the typical conference call requires multiple steps and various network entities. First, a day and time for the conference call must be scheduled. After scheduling, resources to facilitate the call must be reserved. For example, a conference bridge for an audio or video portion of the conference is reserved. Once the necessary resources are reserved and allocated for the conference call, conference access data may need to be supplied to each participant. For example, a conference bridge number and password may need to be distributed to conference participants to permit calling into the conference bridge. Once call setup is complete the actual conference call requires additional steps. Namely, each conference participant must connect to the conference call at the appropriate time with the appropriate capability to interact with other participants, including possibly the exchange of audio data, video data, files, conference presentation materials and the like.

FIG. 1 is a block diagram of a communications system 100 that supports enhanced call services. The communications system 100 depicts a third generation wireless system, as defined by the 3$^{rd}$ Generation Partnership Program, also known as 3 GPP (see 3 gpp.org). In such a system, terminals 102 are typically mobile radiotelephone devices that include a user interface and an interface for coupling to communications system 100. The user interface of user terminal 102 is typically referred to as terminal equipment and generally includes an audio interface, such as a microphone and speakers, a visual interface, such as a display, and a user input interface, such as a keyboard or touch pad. The interface for coupling to the system 100 is typically referred to as a mobile terminal and generally includes an over-the-air interface for transmitting and receiving data. In the typical environment, base stations 104 include an over-the-air interface that is complementary to the over-the-air interface of user terminal 102, thereby permitting terminal 102 and base stations 104 to communicate over-the-air. When the interface employed by user terminal 102 and base station 104 is an over-the-air interface, the communication system 100 is generally referred to as a wireless communications system. When the interface employed by user terminal 102 is a packet-based protocol, the communication system 100 is generally referred to as a packet based communications system.

During operation, the communications that are directed to and received from user terminals 102 via base stations 104 are coordinated and transferred using a serving device, such as a GPRS (GSM Packet Radio System) support node (SGSN) 106, a gateway GPRS support node (GGSN) 110, a call session control function (CSCF) 114 and a home subscriber system 118. SGSN 106 coordinates transmissions to and from base stations 104. SGSN 106 is coupled to GGSN 110 via a data link 112. GGSN 110 interfaces the communications to and from SGSN 106 to other networks. Call session control function 114 is coupled to GGSN 110 via a data link 116. Call session control function 114 coordinates and executes a signaling protocol used to establish, maintain and control calls or sessions for communications involving user terminals 102. A home subscriber system 118 is coupled to call session control function 114 via a data link 120. Home subscriber system 118 includes subscriber profile information, including information traditionally associated with a home location register for a mobile subscriber.

To facilitate ancillary and support functions within communications system 100, a charging gateway function (CGF) 122 and a media resource function 124 may be provided. Charging gateway function 122 is coupled to SGSN 106 and GGSN 110 to account for packets passing through these elements for accounting, billing and other purposes. Media resource function 124 is coupled to call session control function 114 and to GGSN 110. Media resource function 124 provides resources for conference bridging, tones, announcements, text-to-speech conversion, automatic speech recognition and other service functions for communications through GGSN 110.

GGSN 110 couples user terminals 102 to other networks. In particular, GGSN 110 is coupled to an Internet protocol (IP) network 146 via a data link 148. Data link 148 preferably implements a packet-based protocol for transfers to a data network. Data link 148 and IP network 146 provide access to any elements connected to IP network 146, such as, for example, a computer 154. GGSN 110 is also coupled to a media gateway 130 via a data link 150. Media gateway 130 is in turn coupled to a public switched telephone network 142 via a communications link 152. Media gateway 130 converts packetized voice received from GGSN 110 to a circuit-switched protocol acceptable to the public switched telephone network 142. Conversely, media gateway 130 converts circuit-switched communications received from public switched telephone network 142 to packetized communications acceptable to GGSN 110. Media gateway 130, data link 150, and communications link 152 provide an interface for user terminals 102 to the public switched telephone network 142. By virtue of this connection, user terminals 102 are coupled to elements attached to the public switched telephone network, such as telephone 144.

The signaling and control necessary to interface GGSN 110 with public switched telephone network 142 is controlled and provided by call session control function 114, a media gateway controller 126, and a transport signaling gateway 134. Media gateway controller 126 is coupled to call session control function 114 via a data link 128. Media gateway controller 126 is coupled to control media gateway 130 via data ink 132. Call session control function 114 determines, based on a signaling protocol, the media gateway resources required for a particular communication or session. These resource requirements are transmitted to media gateway controller 126, which in turn, configures and establishes the necessary resources in media gateway 130 and provides the necessary signaling to transport signaling gateway 134. The resources in media gateway 130 are configured to transfer the actual (bearer) data between the GGSN 110 and the public switched telephone network 142. Transport signaling gateway 134 converts the signaling protocol from the media gateway controller 126 to a signaling protocol used by the public switched telephone network 142.

Applications and enhanced call services are preferably coupled to communication system 100 for use in interaction with user terminals 102. In particular, call session control function 114 is coupled to an applications and call services network 156 via a data link 158. A myriad of call services and applications may reside in or be coupled to the network 156, including database services from database 160. For additional detail, the interested reader may refer to U.S. patent application Ser. No. 09/953,509, filed Sep. 14, 2001, entitled "TARGETED AND INTELLIGENT MULTIMEDIA CONFERENCE ESTABLISHMENT SERVICES," invented by Henrikson et al., and assigned to the assignee of the present application.

The steps required to establish a successful conference call under the system of FIG. 1 are cumbersome and time consuming, require considerable network resource, network administration, and network-based call session control. In addition, these steps may also require the scheduling of network resources and caller participation well in advance of the anticipated call. In general, these call operations are not characterized as real-time or spontaneous, and more importantly, they are not network independent. Notwithstanding these shortcomings, enhanced call services are of increasing importance and value to system subscribers. The advent and proliferation of proposed third generation wireless systems, coupled with the promise of ubiquitous availability will only make such call services more desirable.

In anticipation thereof, a growing need exists for on-demand call conferencing and multi-party call waiting routines that reduce the cumbersome nature and network dependence exhibited by existing call services that support call conferencing and call waiting.

SUMMARY OF THE INVENTION

In accordance with one aspect of the present invention a packet data terminal implements call waiting and call conferencing services with little or no network support. The packet data terminal in accordance with the invention employs a digital-to-analog (D/A) converter for converting a first and a second packet data stream into separate analog representations. Thereafter, a selective mixer selectively manipulates the analog representations to provide either a mixed or a non-mixed output. A mixed output is characteristic of the provision of call conferencing service. A non-mixed output is characteristic of the provision of call waiting service. The data terminal employs a digital mixer that converts analog voice into a packet data stream. A multiplexer circuit distributes the packet data stream to a plurality of call sessions during a conference call while distributing the packet data stream to a single call session for purposes of call waiting service. In accordance with another aspect of the invention, the data terminal employs a user input device permitting users to select the establishment of call waiting and/or call conferencing service.

In accordance with another aspect of the invention, a method is provided for establishing conference call service. The method begins with the receipt of a plurality of digital voice data streams by the data terminal, each digital voice data stream representing a separate call session. Each digital voice data stream is then converted into a separate analog representation corresponding to a call session. An election is made by the device user that selects call sessions of interest. Analog representations of the call sessions of interest are combined one with another to produce a first mixed output. The first mixed output is combined with user-generated voice signals to produce a second mixed output, which, in turn, is converted into a packet data stream. The packet data stream is then routed to the call sessions of interest to complete the conference call.

In another aspect of the invention, a method is provided for establishing call waiting service. The method begins with the receipt of a plurality of digital voice data streams by the data terminal, each representing a separate call session. Each digital voice data stream is then converted into a separate analog representation corresponding to a call session. An election is made by the device user that selects a call session of interest. An analog representation of the call session of interest may be combined with user-generated voice signals, to produce an analog output, which, in turn, is converted into a packet data stream. The packet data stream is then routed to a single call session of interest for purposes of supporting call waiting.

DESCRIPTION OF THE PREFERRED EMBODIMENTS

Figure 2:
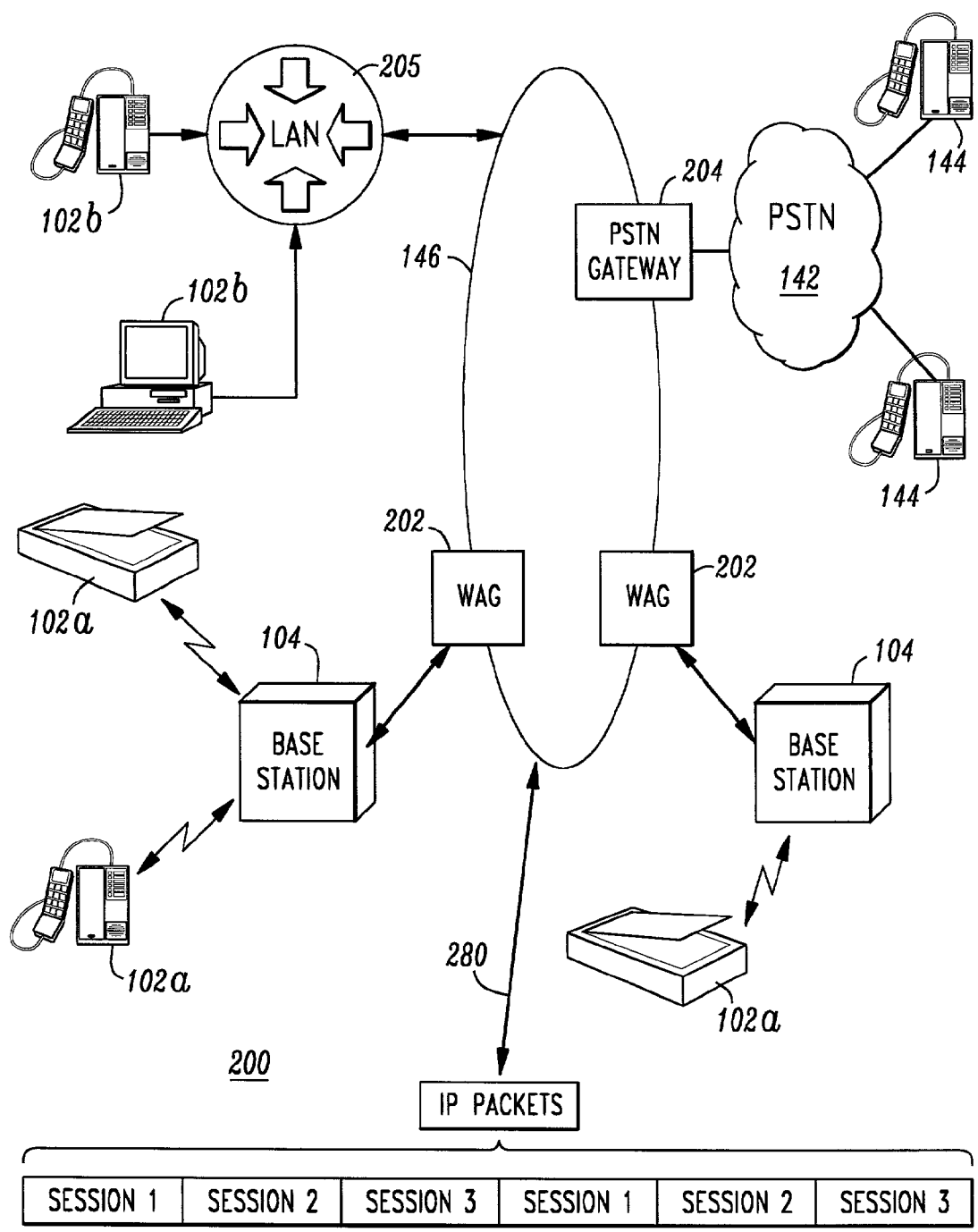
FIG. 2 is a block diagram of a communications system that provides on-demand, network independent, call establishment services in accordance with the present invention.

FIG. 2 is a block diagram of a communications system that provides on-demand call establishment services in accordance with the present invention. The communications system 200 depicts, in part, a third generation wireless system, as defined by the $3^{rd}$ Generation Partnership Program, also known as 3 GPP (see 3 gpp.org). In such a system, terminals $102_a$ may be mobile radiotelephone devices, personal digital assistants (PDAs), modems, network access devices, Internet peripherals, and the like. Such wireless terminals $102_a$ generally include a user interface and an interface for coupling to communications system 200. The user interface of a terminal $102_a$ is often referred to as terminal equipment. The user interface generally includes an audio interface, such as a microphone and speaker, a visual interface, such as a display or graphic user interface (GUI), and a user input interface, such as a keyboard, touch pad, keypad, touch screen, track-ball system, voice recognition system, hand writing recognition system, or combinations thereof.

The interface for coupling wireless terminals $102_a$ to the system 200 is typically referred to as a mobile terminal and generally includes an over-the-air interface for transmitting and receiving data. In the typical environment, base stations 104 include an over-the-air interface that is complementary to the over-the-air interface of user terminal $102_a$, thereby permitting terminals $102_a$ and base stations 104 to communicate. While the suggested over-the-air interface is one defined by 3 GPP (see 3 gpp.org), it will be appreciated by those skilled in the art that several other wireless interfaces are known in the art and may be substituted therefore, without departing from the spirit of the present invention.

Figure 1:
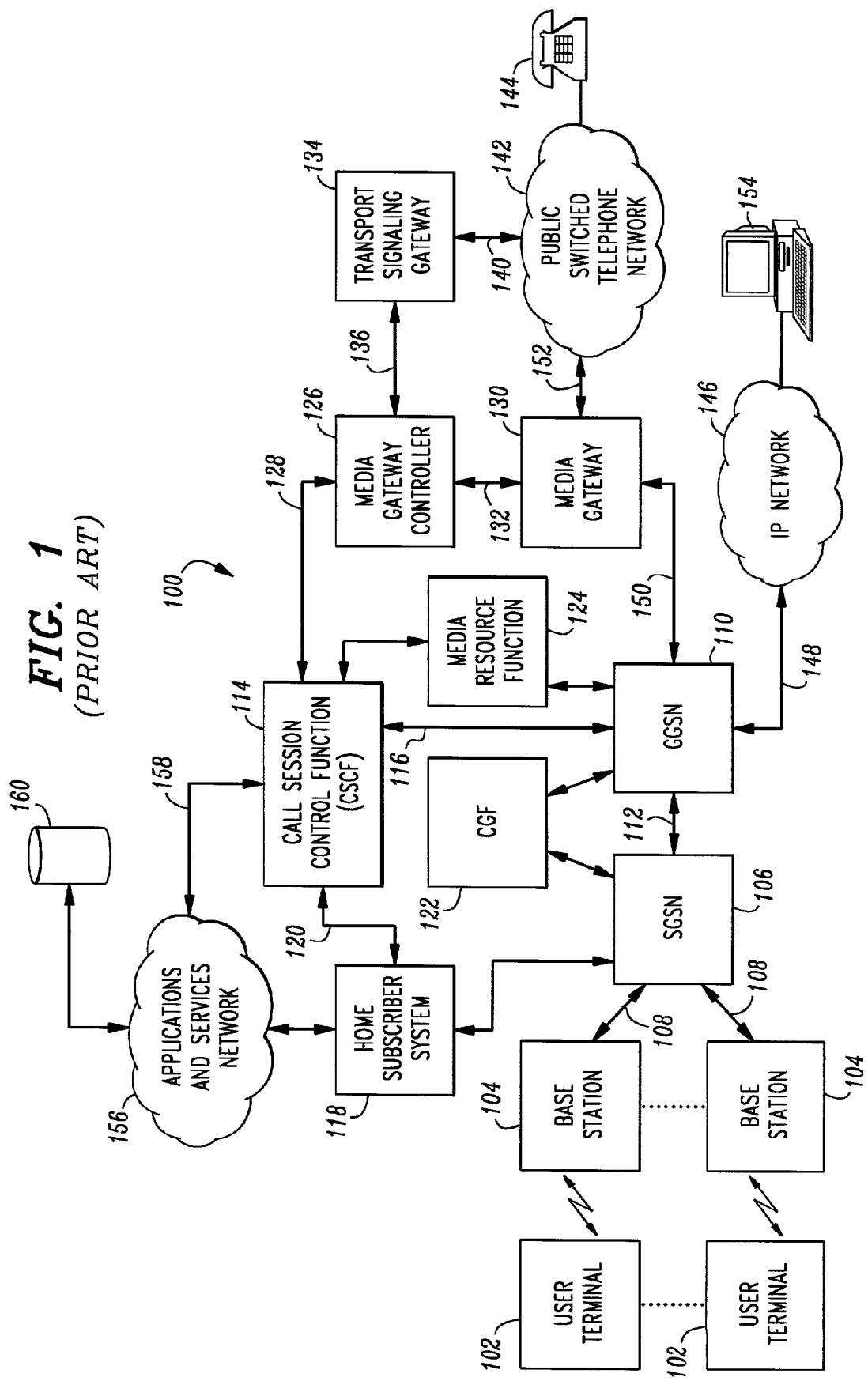
FIG. 1 is a block diagram of a prior art communications system that provides network-based call establishment services.

During operation, the communications that are directed to and received from user terminals $102_a$ via base stations 104 are coordinated and transferred using a serving device, such as a wireless access gateway (WAG) 202. In accordance with a preferred embodiment, when user terminals $102_a$ are mobile radiotelephones, WAG 202 may consist of the GPRS (GSM Packet Radio System) equipment (106–124) described in association with FIG. 1. As will be appreciated after review hereof, WAG 202 may also couple user terminals $102_a$ to other networks. In accordance, WAG 202 is also shown coupled to an Internet protocol (IP) network 146 via well-known data links (not shown). Such data links implement packet-based protocols providing access to any elements connected to IP network 146, such as, for example, a telephone 144, through a Public Switched Telephone Network (PSTN) 142.

With further reference to FIG. 2, IP network 146 is shown coupled to PSTN gateway 204 via a data link (not shown). As previously discussed, such data links implement well known packet-based protocols within the knowledge of those skilled in the art, and therefore are not described herein in detail. PSTN gateway 204 is in turn coupled to PSTN 142 via communications link 152. During operation, PSTN gateway 204 converts packetized voice received from WAG 202 to a circuit-switched protocol acceptable to PSTN 142. Conversely, PSTN gateway 204 converts circuit-switched communications received from PSTN 142, to packetized communications acceptable to WAG 202. By virtue of this connection, user terminals $102_a$ are coupled to devices attached to the PSTN 142, such as telephones 144.

The communications system 200 also depicts, in part, a local area network (LAN) communication system, as may be defined by the Institute of Electronic and Electrical Engineering (IEEE), American National Standards Institute (ANSI), European Transmission Standards Institute (ETSI), or other similar governmental or industry standards organization. In such a system, user terminals $102_b$ may be wired or wireless devices such as, but not limited to, personal computers (PCs), personal digital assistants (PDAs), network access devices, Internet peripherals, and the like. Such terminals $102_b$ generally include a user interface and a LAN interface.

The user interface of terminals $102_b$ is typically referred to as terminal equipment. The user interface generally includes an audio interface, such as a microphone and speaker, a visual interface, such as a display or graphic user interface (GUI), and a user input interface, such as a keyboard, touch pad, keypad, touch screen, track-ball system, voice recognition system, hand writing recognition system, or combinations thereof. The LAN interface couples terminals $102_b$ to the system 200 via a communications protocol for transmitting and receiving data, thereby permitting terminals $102_b$ and the access point 206 to communicate. While the suggested LAN is one that may be defined by the IEEE 802.11 standard, it will be appreciated by those skilled in the art that several other wired and/or wireless LAN protocols are known in the art and may be substituted therefore, without departing from the spirit of the present invention.

During operation, communications that are directed to and received from a user terminal $102_b$ via access point 206 are coupled to the Internet protocol (IP) network 146 via well-known data links (not shown). Such data links implement packet-based protocols providing access to any elements connected to IP network 146, such as, for example, the other user terminals $102_a$ and $102^b$, or telephone 144 through PSTN 142.

With further reference to FIG. 2, a high level structure of IP transmission packets 280 for use within the Internet protocol (IP) network 146 are shown. Since details regarding IP transmission packets 280 are well within the knowledge of those skilled in the art, no further description will be provided at this time.

Figure 3:
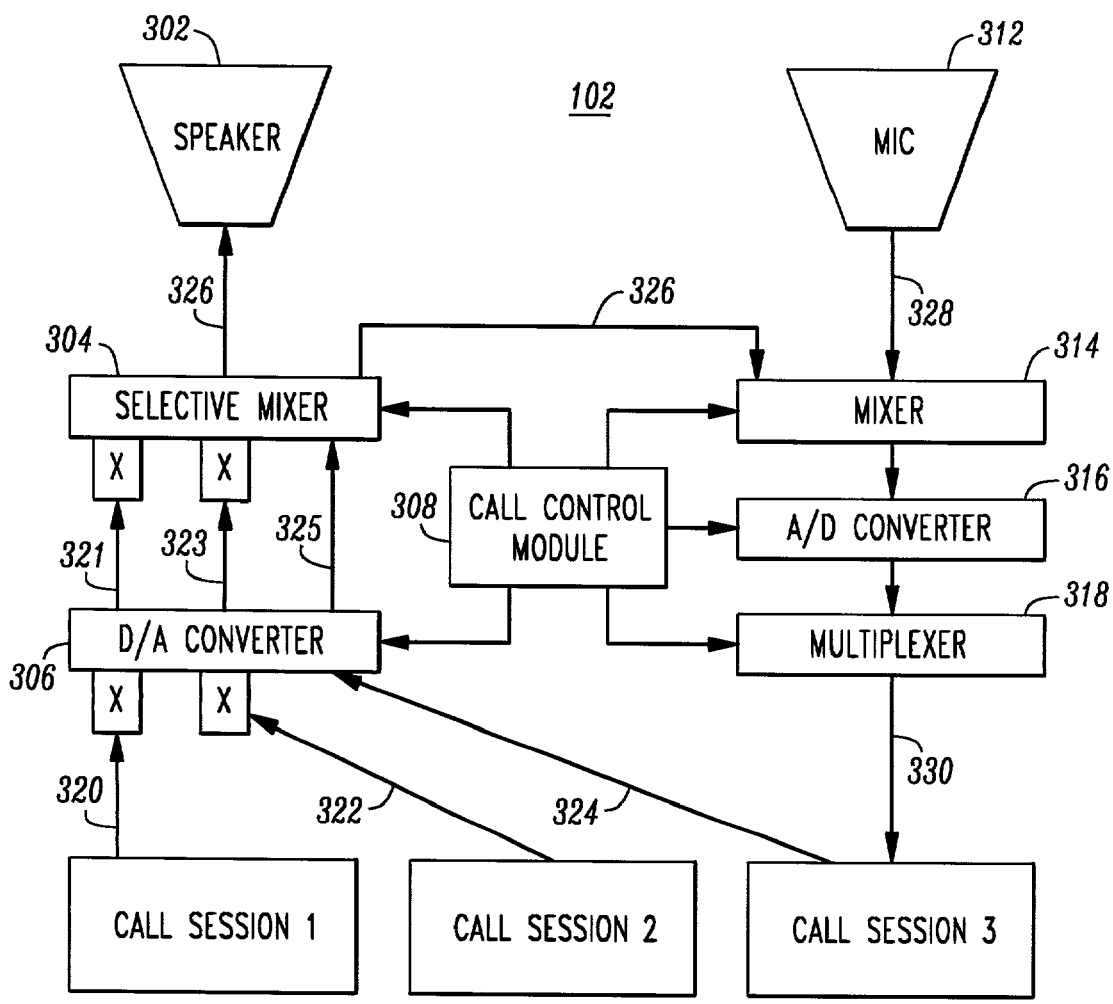
FIG. 3 is a first block diagram of a user terminal of FIG. 2.

FIG. 3 is a block diagram of a user terminal $102_a$ or $102_b$ of FIG. 2. As will be appreciated by those skilled in the art, the user terminal of FIG. 2 is capable of receiving a plurality of packet data streams (320–324) comprising audio, data, video, or combinations thereof. Each packet data stream (320–324) is presented to respective input ports of a selective digitizer 306. In accordance with the preferred embodiment, the selective digitizer 306 is a digital-to-analog (D/A) converter. In an alternative embodiment, the selective digitizer 306 may comprise any of the available encoder, vocoder, or transcoder techniques known in the art, used alone or in combination with a D/A converter. As shown, the input ports of selective digitizer 306 are individually controlled and enabled/disabled by call control module 308. The selective digitizer 306 operates to convert an incoming packet data stream into separate analog representations (321–325). The analog representations (321–325) may then be communicated to respective input ports associated with selective mixer 304.

Similar to selective digitizer 306, the selective mixer 304 input ports are individually controlled and enabled/disabled by call control module 308. In accordance with the present invention, call control module 308 is a processing device such as a central processing unit (CPU), digital signal processor (DSP), or an equivalent application specific processing unit (ASPU), with or without a separate memory storage device. The enable/disable operations controlled by call control module 308 may employ any of the well know memory device access or bus addressing techniques available in the art. Assuming a DSP-based call control module 308 implementation, it will be appreciated by those skilled in the art that several of the functions described in association with FIG. 3 may, in fact, be performed by call control module 308. By way of example, and not by way of limitation, the function of selective digitizer 306 may be performed by an appropriately programmed DSP, without departing from the spirit of the present invention.

As previously discussed, each user terminal $102_a$ and $102_b$ has an input device, such as a keyboard, touch pad, keypad, touch screen, track-ball system, voice recognition system, hand writing recognition system, or some combinations thereof. The input device (not shown) is coupled to call control module 308, enabling the user to make call service elections, such as, for example call waiting service or conference call service. In response to user election and under direction of call control module 308, selective mixer 304 sums, mixes, blends, synthesizes, combines, or otherwise manipulates the analog representations (321–325) to provide either a mixed or a non-mixed output 326 to speaker 302. In accordance with the preferred embodiment, a non-mixed output 326 from selective mixer 304 is synonymous with the provision of a static call or call waiting service. A mixed, summed, blended, or otherwise composite output 326 from selective mixer 304 is synonymous with the provision of call conferencing service. That is, the composite output from selective mixer 304 represents a conference. Selective mixer 304 is preferably implemented by an analog mixer in which the set of inputs are controlled by call control module 308.

During operation, the terminal user uses the audio interface consisting of speaker 302 and microphone (MIC) 312 to communicate with a party or parties of interest. With reference to FIG. 3, analog voice 328 from MIC 312 and feed back 326 from selective mixer 304 are provided to a mixer digitizer consisting of a mixer 314 and an analog-to-digital (A/D) converter 316. The analog inputs 326 and 328 are then summed, mixed, blended, synthesized, or otherwise combined to produce a composite representation of the original inputs. This mixed or composite signal is delivered to A/D converter stage 316. A/D converter 316 converts the mixed or otherwise composite signal to a packetized data stream. A/D converter 316 may include an encoder, vocoder or transcoder. The mixer 314 is preferably implemented by an analog mixer like those known in the art.

From A/D converter 316, the packet data stream is provided to a multiplexer circuit (MUX) 318. Under direction of call control module 308, MUX 318 distributes the packet data stream 330 to call sessions of interest. The distribution operation performed by MUX 318 may employ any of the well known memory device access or bus addressing techniques available in the art.

MUX 318 distributes the packet data stream 330 to a single call session for purposes of static call mode and call waiting mode services. Conversely, MUX 318 communicates the packet data stream 330 to a plurality of call sessions for purposes of establishing and maintaining a conference call. Of note, the static call mode is distinguished from the multi-party call waiting mode, in that the static mode is characterized by a single in-bound call session.

Based upon the prior discussion and with reference to FIG. 3, it will be appreciated by those skilled in the art that the terminal 102 is shown engaged in the call waiting service mode. By way of example, and not by way of limitation, terminal 102 is in receipt of a plurality of in-bound call sessions. Notwithstanding, the selective digitizer 306 and selective mixer 304 inputs associated with analog representations 321 and 323 have been disabled by call control module 308. By disabling the selective digitizer 306 and selective mixer 304 inputs associated with analog representations 321 and 323, terminal 102 does not decode voice stream data from devices associated with call sessions 1 and 2. With respect to call session 3, it will be appreciated that selective mixer 304 receives the analog representation 325, which corresponds to voice data stream 324 and call session 3. As such, call session 3 is serviced by terminal 102 and the selective mixer output 326 comprises a non-mixed signal. Under direction from call control module 308, MUX 318 communicates packet data stream 330 to call session 3 only. As such, call session 3 will be serviced by terminal 102, while call sessions 1 and 2 are, in effect, on-hold.

Figure 4:
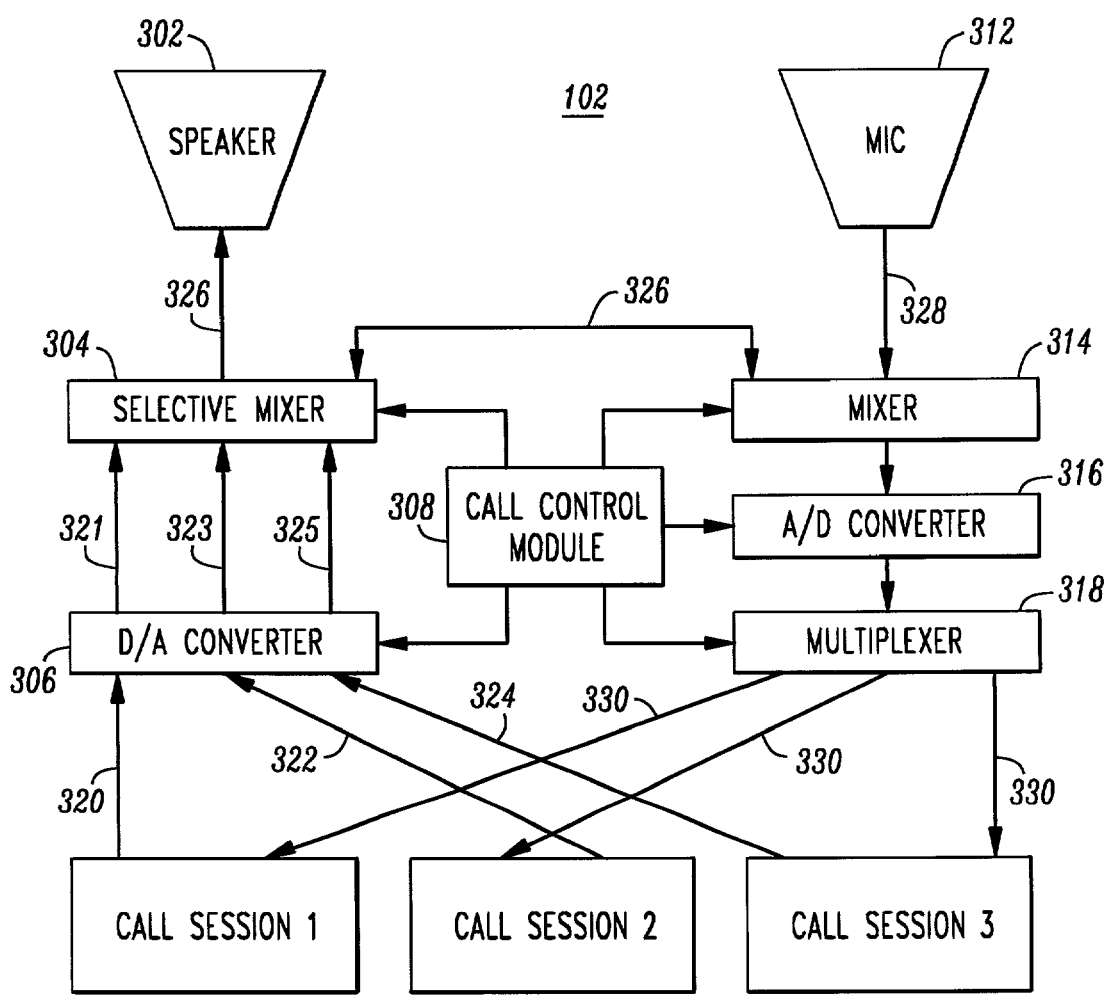
FIG. 4 is another block diagram of a user terminal of FIG. 2.

FIG. 4 is another block diagram of the user terminal 102$_a$ and 102$_b$ of FIG. 2. The user terminal 102 of FIG. 4 is identical to the user terminal 102 depicted in FIG. 3, except the user terminal 102 of FIG. 4 is shown operating in the conference call or multi-party call service mode. By way of example, and not by way of limitation, the user terminal 102 of FIG. 4 is in receipt of a plurality of in-bound call sessions. Notwithstanding, the selective mixer 304 inputs associated with analog representations 321, 323, and 325 are enabled by call control module 308. By enabling the selective mixer 304 inputs associated with analog representations 321, 323, and 325, terminal 102 receives voice stream data from the devices associated with call sessions 1, 2 and 3. As such, call sessions 1, 2, and 3 are serviced by terminal 102 and the selective mixer output 326 comprises a mixed or composite signal. Under direction from call control module 308, MUX 318 communicates the packet data stream 330 to call sessions 1, 2, and 3, i.e., the call sessions of interest. As such, call sessions 1, 2, and 3 are serviced by terminal 102 and a conference call is established and maintained.

Figure 5:
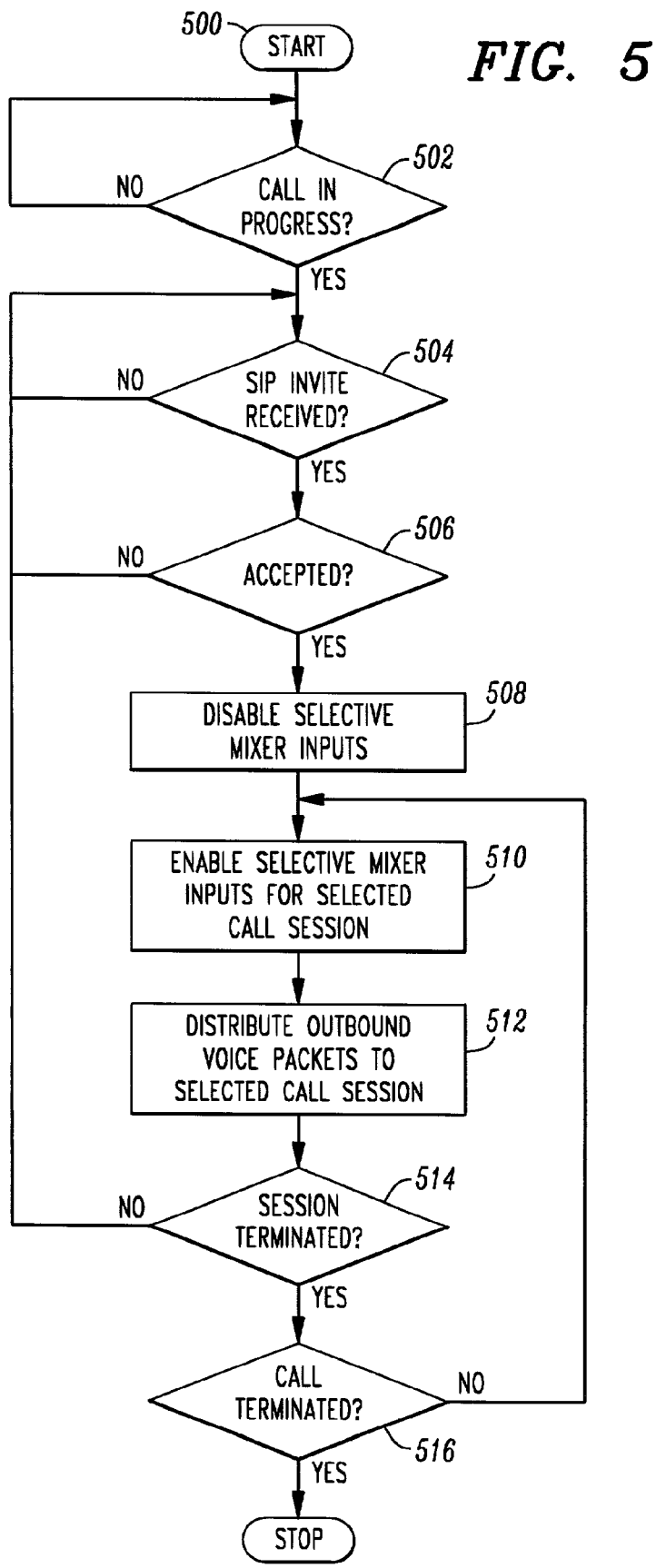
FIG. 5 is a flow chart illustrating a method for establishing call waiting service in accordance with the present invention.

FIG. 5 is a flow chart illustrating a method for establishing call waiting service in accordance with the present invention. FIG. 5 is described herein with reference to the device shown in FIG. 3. It will be appreciated by those skilled in the art that the routine of FIG. 5 is employed by user terminal 102 of FIG. 3 when establishing call waiting service in accordance with the present invention. In accordance, the steps described in association with FIG. 5 are those performed by a device, or under the control of a device, such as call control module 308, which, in accordance with the preferred embodiment, is a central processing unit (CPU), digital signal processor (DSP), or equivalent application specific processing unit (ASPU) with or without accompanying memory.

Commencing at step 500, flow proceeds to step 502 where a determination is made whether there is an active call session in progress. Assuming not, flow continues to monitor step 502, until such time as an active call session is detected. Of note, it matters not whether the call is originated or terminated at user terminal 102.

From step 502, flow proceeds to step 504 where the user terminal awaits a SIP (Session Initiation Protocol) INVITE message, such as, for example, the messaging defined by the Internet Engineering Task Force—IETF—RFC 2543, indicating that an incoming call from a terminating call session is attempting to contact terminal 102. From step 504, flow proceeds to step 506 where a determination is made whether the user elects to accept or reject the call for call waiting purposes. Assuming the user elects to refrain from initiating call waiting service, flow branches back to step 504 to await receipt of another SIP INVITE message. Otherwise, the user utilizes an input device like those described herein above to initiate call waiting service.

In response to initiation of call waiting service by the user, flow proceeds from step 506 to step 508, where the call control module 308 of FIG. 3 disables the selective digitizer 306 and selective mixer 304 input port associated with the in progress call session detected at step 502. From step 508, flow proceeds to step 510 where the call control module 308 enables selective digitizer 306 and selective mixer 304 input ports associated with the call session identified by the SIP INVITE message and accepted by the user at step 506. Collectively, steps 508 and 510 of FIG. 5 operate to select, from amongst a number of available call sessions, the call session of interest.

With reference to FIG. 3, upon selection of a call session of interest, the user terminal 102 proceeds to mix at mixer 314 the analog representation 326 of the call session of interest, with the user generated voice from microphone 312 to produce a mixed output that is converted into a packet data stream 330.

Returning to FIG. 5, flow proceeds from step 510 to step 512 where the packet data stream, which includes voice or data, is distributed by multiplexer 318 to the call session of interest. From step 512, flow proceeds to step 514 where a check is made to determine whether the call session of interest has terminated. If not, flow branches back to step 504 where the terminal awaits receipt of an additional SIP INVITE message. Assuming the call session of interest terminates at step 514, flow proceeds to step 516 where a determination is made whether a call placed on-hold at step 508 is still available. Assuming an on-hold call is available, flow branches back from step 516 to step 510, which operates to select, from amongst a number of available call sessions, another call session of interest. Otherwise, if all call sessions have ended at step 516 the process terminates.

Figure 6:
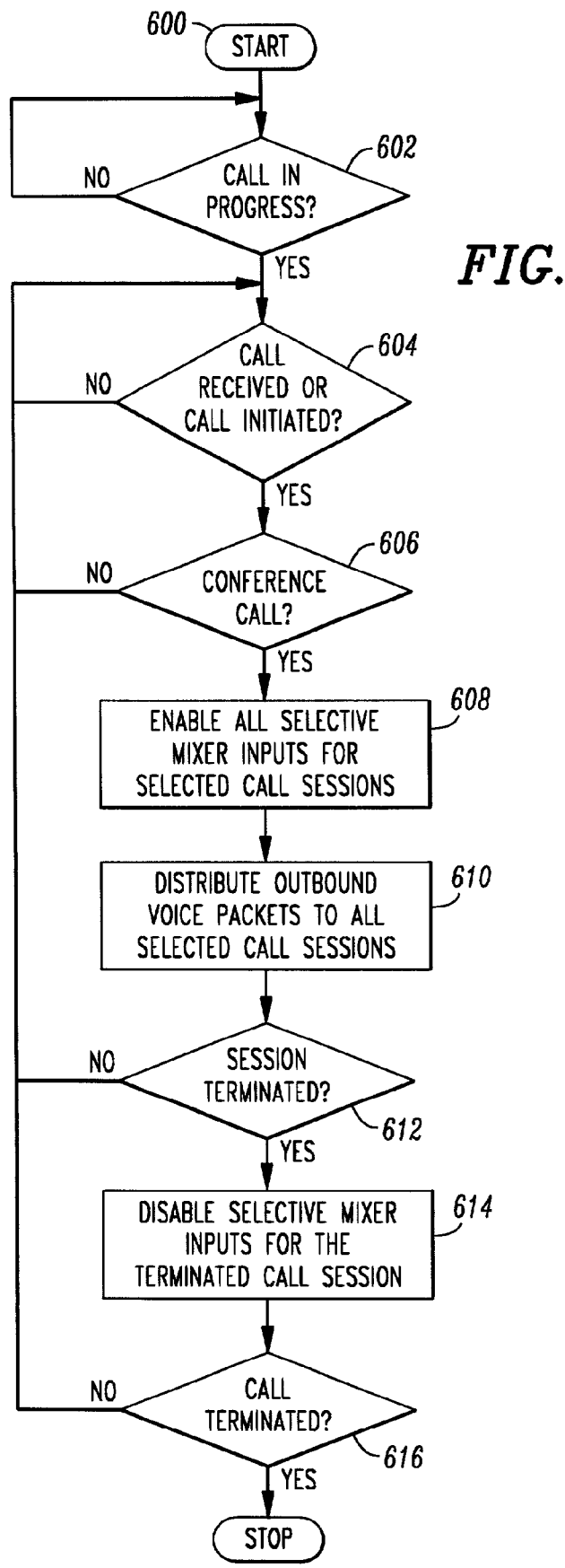
FIG. 6 is a flow chart illustrating a method for establishing conference call service in accordance with the present invention.

FIG. 6 is a flow chart illustrating a method for establishing conference call services in accordance with the present invention. FIG. 6 is described below with reference to the device shown in FIG. 4. It will be appreciated by those skilled in the art that the routine of FIG. 6 is employed by user terminal 102 of FIG. 4 when establishing on-demand conference call and/or multi-party call service. In accordance, the steps described in association with FIG. 6 are those performed by a device, or under the control of a device, such as call control module 308, which, in accordance with the preferred embodiment is a central processing unit (CPU), digital signal processor (DSP), or equivalent application specific processing unit (ASPU) with or without accompanying memory. Commencing at step 600, flow proceeds to step 602 where a determination is made whether there is an active call session in progress. Assuming not, flow continues to monitor step 602, until such time as an active call session is detected. Of note, it matters not whether the call is originated or terminated at user terminal 102.

From step 602, flow proceeds to step 604 where the user terminal awaits: 1) receipt of an incoming call session, as indicated, for example, by a SIP (Session Initiation Protocol) INVITE message, of the type defined by Internet Engineering Task Force—IETF—RFC 2543, and indicating that an incoming call for a call session is attempting to contact terminal 102; or 2) receipt of an outbound call request, indicating that the terminal user is attempting to make a call, as indicated, for example, by a SIP (Session Initiation Protocol) INVITE message. From step 604, flow proceeds to step 606 where a determination is made whether the user elects to accept or reject the call for conference call purposes. Assuming the user elects to refrain from initiating conference call services, flow branches back to step 604 to await receipt or initiation of another call. Otherwise, the user utilizes an input device like the ones described herein above to initiate a conference or multi-party call.

In response to user election, flow proceeds from step 606 to step 608, where the call control module 308 of FIG. 3, in response to the user selected input, enables the selective digitizer 306 and selective mixer 304 input ports associated with the call session detected at step 602. From step 608, flow proceeds to step 610 where the call control module 308 of FIG. 4 enables selective mixer 304 input ports associated with the call sessions identified by the SIP INVITE message and accepted by the user at step 606. Collectively, the steps 604–608 of FIG. 6 operate to select, from amongst a plurality of available call sessions, those call sessions of interest to the user.

With reference to FIG. 4, upon selection of said call sessions of interest, the user terminal 102 proceeds to mix at selective mixer 304 the analog representations 321, 323, and 325 of the call sessions of interest. Thereafter, the mixed output 326 is combined with user-generated voice from microphone 312 to produce another mixed output that is converted into a packet data stream 330 by mixer 314 and A/D converter 316.

Returning to FIG. 6, flow proceeds from step 608 to step 610 where the packet data stream, which includes at least one of voice and data packets, is distributed by multiplexer 318 of FIG. 4 to the call sessions of interest. From step 610, flow proceeds to step 612 where a check is made to determine whether a conference call session has terminated. If not, flow branches back to step 604 where the terminal awaits receipt or initiation of additional calls. Assuming a conference call session of interest terminates at step 612, flow proceeds to step 614 where associated selective digitizer 306, selective mixer 304 and MUX 318 inputs/outputs are disabled to halt distribution of packet data 330 to terminated call sessions at step 612. Call termination ends the flow at step 616.

Advantageously, the invention described herein allows a party to elect call-waiting and/or conference call services in a very timely and cost efficient manner. Based upon this arrangement, the user elects on-demand call waiting and call conferencing services. Unlike the prior art, the user is permitted to establish call conference services for originating and terminating calls, alike. Moreover, the call conference service described herein is established without the coordination of, and use of, substantial network resources. Of additional importance, call waiting as described herein is a multi-party call service, permitting multiple calls to be placed on-hold.

Whereas the present invention has been described with respect to specific embodiments thereof, it will be understood that various changes and modifications will be suggested to one skilled in the art and it is intended that the invention encompass such changes and modifications as fall within the scope of the appended claims.

The invention claimed is:

1. A packet data terminal comprising:
   a digital-to-analog converter, for receiving a first packet data stream and a second packet data stream and converting the first packet data stream and the second packet data stream into a first analog representation and a second analog representation, respectively;
   a selective mixer, coupled to the digital-to-analog converter, for selectively mixing the first analog representation and the second analog representation to provide one of a mixed and a non-mixed output;
   a mixer digitizer, operably coupled to the selective mixer, that:
      receives the one of the mixed and the non-mixed analog output from the selective mixer,
      mixes the one of the mixed and the non-mixed analog output with voice from a microphone to generate mixed voice, and
      converts the mixed voice into packet data; and
   a multiplexer, coupled to the digital mixer, that distributes the packet data.

2. The terminal of claim 1 wherein each of the first packet data stream and the second packet data stream identifies a call session.

3. The terminal of claim 2 wherein the first packet data stream and the second packet data stream comprise at least one of voice and data.

4. The terminal of claim 1 further comprising a user interface.

5. The terminal of claim 4 wherein the user interface has an input device selected from the group consisting of: keyboards, keypads, touch screens, graphic user interfaces, track-ball systems, voice recognition systems, hand writing recognition systems, and combinations thereof.

6. The terminal of claim 5 further comprising a control module coupled to the selective mixer and the user interface.

7. The terminal of claim 1 wherein the selective mixer output is determined as a function of user action.

8. The terminal of claim 7 wherein the selective mixer provides a mixed output in response to a conference call election by a user.

9. The terminal of claim 7 wherein the selective mixer provides a non-mixed output in response to a call-waiting election by a user.

10. In a telecommunications system that couples voice communication users, a packet data terminal comprising:
   a digital-to-analog converter that:
      receives a plurality of packet voice data streams, and
      converts each packet voice data stream of the plurality of packet voice data streams into a plurality of separate analog representations;
   a selective mixer, coupled to the digital-to-analog converter, that do selectively mixes the plurality of separate analog representations to provide one of a mixed and a non-mixed analog output;
   a mixer digitizer, operably coupled to the selective mixer, that:
      receives the one of the mixed and the non-mixed analog output from the selective mixer,
      mixes the one of the mixed and the non-mixed analog output with voice from a microphone to generate mixed voice, and
      converts the mixed voice into packet data;
   a multiplexer, coupled to the digital mixer, that distributes the packet data; and
   a call control module, coupled to the selective mixer and the multiplexer, wherein selective mixer output and packet data distribution are controlled by the call control module as a function of user election.

11. The terminal of claim 10 further comprising a user interface coupled to the call control module.

12. The terminal of claim 10 wherein the mixer digitizer further comprises an analog-to-digital conversion stage.

13. The terminal of claim 10 wherein the multiplexer distributes packet data to a plurality of call sessions in response to a conference call election by the user.

14. The terminal of claim 10 wherein the multiplexer distributes packet data to a single call session in response to a call-waiting election by the user.

15. A method for establishing conference call service comprising the steps of:
   receiving, at a data terminal, a plurality of digital voice data streams, each digital voice data stream representing a separate call session;
   converting each digital voice data stream into a plurality of separate analog representations;
   selecting, from amongst the plurality of separate analog representations, the call sessions of interest;
   mixing the plurality of separate analog representations of the call sessions of interest, one with another, to produce a first mixed output;
   mixing the first mixed output, with user generated voice signals, to produce a second mixed output;
   converting the second mixed output into a packet data stream; and
   distributing the packet data to the call sessions of interest.

16. The method of claim 15 wherein the step of selecting the call sessions of interest further comprises the steps of:
   enabling selective mixer inputs associated with the call session of interest; and
   disabling selective mixer inputs associated with all call sessions other than the call session of interest.

17. The method of claim 15 wherein the step of distributing the packet data further comprises the step of addressing a multiplexer stage associated with a call session of interest.

* * * * *